United States Patent [19]

Sano et al.

[11] Patent Number: 4,506,899
[45] Date of Patent: Mar. 26, 1985

[54] VEHICULAR STEERING SYSTEM

[75] Inventors: Shoichi Sano, Tokyo; Yoshimi Furukawa, Saitama, both of Japan

[73] Assignee: Honda Giken Kogyo Kabushiki Kaisha, Tokyo, Japan

[21] Appl. No.: 499,382

[22] Filed: May 31, 1983

[30] Foreign Application Priority Data

Jun. 1, 1982 [JP] Japan ................................ 57-93396
Jun. 1, 1982 [JP] Japan ................................ 57-93397

[51] Int. Cl.³ .............................................. B62D 7/00
[52] U.S. Cl. ...................................... 280/91; 280/99
[58] Field of Search ............... 180/140, 234, 236, 240; 280/771, 91, 95 R, 95 A, 96, 98, 99, 103; 74/39, 40, 42, 43, 50, 89, 89.16, 89.2, 496, 498

[56] References Cited

U.S. PATENT DOCUMENTS

3,365,213  1/1968  Bentley et al. ................... 280/95 A
3,627,347 12/1971  Herbenar ........................... 280/95 A
4,406,472  9/1983  Furukawa ............................. 280/91

Primary Examiner—Joseph F. Peters, Jr.
Assistant Examiner—Ross Weaver
Attorney, Agent, or Firm—Irving M. Weiner; Pamela S. Burt

[57] ABSTRACT

A vehicular steering system for steering both front and rear wheels through steering operation of a steering wheel wherein a rear wheel steering mechanism is advantageously reduced in both size and weight. The rear wheel steering mechanism includes a shaft member which rotates in interlocking cooperation with a steering wheel and which is inserted and supported rotatably through a cylindrical holder in a sleeve fixed to the vehicle body. A crank pin is attached to the shaft member, with a joint member being loosely mounted and supported thereon. A link mechanism is pivoted at one end thereof to the vehicle body and integrally connected at the other end thereof to the joint member, and right and left rear wheel steering tie rods are connected and supported respectively through ball joints to the right and left of the joint member. The axis of each rear wheel steering tie rod, the center of each ball joint and the core of the crank pin are substantially aligned with one another on each of the right and left sides.

2 Claims, 8 Drawing Figures

VEHICULAR STEERING SYSTEM

BACKGROUND OF THE INVENTION

1. Field of the Invention

The present invention relates generally to a vehicular steering system for steering both front and rear wheels through steering operation of a steering wheel. Particularly, the invention relates to a vehicular steering system which provides for reduction in both size and weight of a rear wheel steering mechanism.

2. Description of Relevant Art

A vehicular steering system capable of steering both front and rear wheels through steering operation of a steering wheel has already been provided, for example, as disclosed by U.S. Pat. No. 4,295,657.

Such steering system is constructed so that rear wheels can be steered in the same direction as front wheels at a small steering angle of a steering wheel and can also be steered in the opposite direction at a large turning angle, whereby not only a good steerability is attained while the vehicle is travelling at high speed, but also because a small radius of gyration is obtained at a large turning angle of the steering wheel during a U-turn or during vehicular movement into or out of a parking lot, the vehicular handling characteristics are substantially improved.

The present invention provides for reduction in both size and weight of a rear wheel steering mechanism in the aforesaid type of vehicular steering system capable of steering both front and rear wheels.

SUMMARY OF THE INVENTION

According to the present invention, there is provided a steering system in a vehicle having front and rear wheels capable of being steered, comprising a shaft member adapted to rotate in interlocking cooperation with a steering wheel, the shaft member being inserted and supported rotatably through a cylindrical holder in a sleeve fixed to a vehicle body, a crank pin attached to the shaft member, a joint member mounted loosely on the crank pin, a link mechanism pivoted at one end thereof to the vehicle body and integrally connected at the other end thereof to the joint member, right and left rear wheel steering tie rods respectively connected to the right and left sides of the joint member, and a ball joint interposed between the joint member and each of the tie rods. The axis of each of the rear wheel steering tie rods, the center of each of the ball joints and the core of the crank pin are substantially aligned with one another.

Accordingly, it is an object of the present invention to provide a vehicular steering system which is extremely advantageous in reducing both the size and weight of a rear wheel steering mechanism in the field of vehicles capable of having both front and rear wheels which are steerable.

A preferred embodiment of the present invention will be described in detail hereinunder with reference to the accompanying drawings, from which the above and further objects, features and advantages of the present invention will become apparent.

DETAILED DESCRIPTION OF A PREFERRED EMBODIMENT

Figure 1:
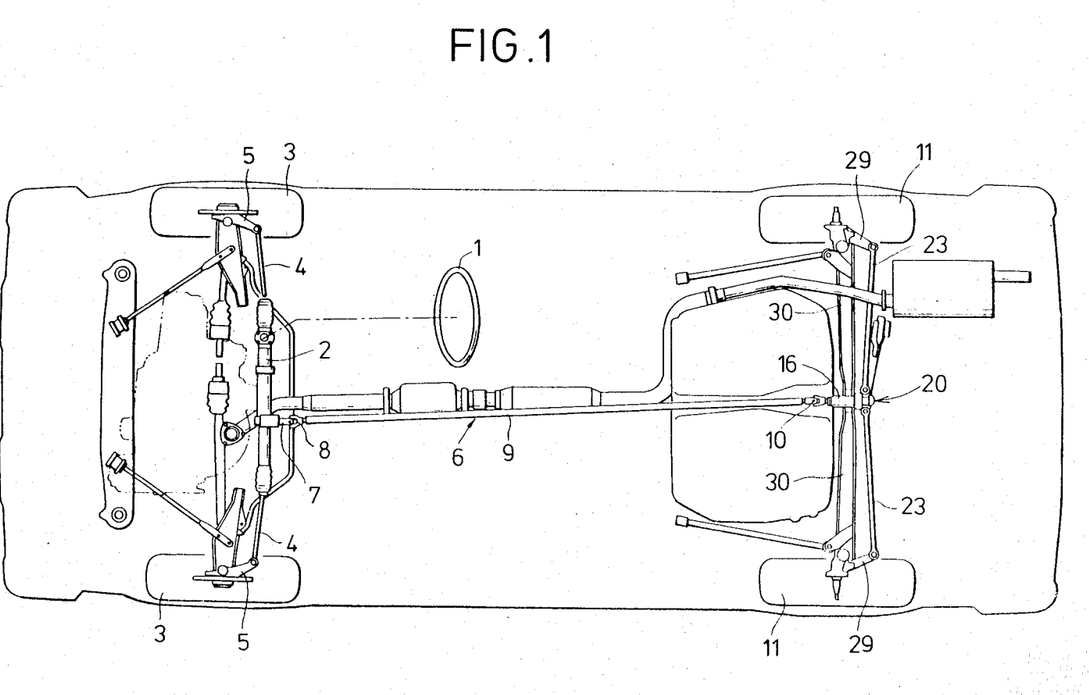
FIG. 1 is an explanatory plan view of a vehicle equipped with a steering system embodying the invention.
Figure 2:
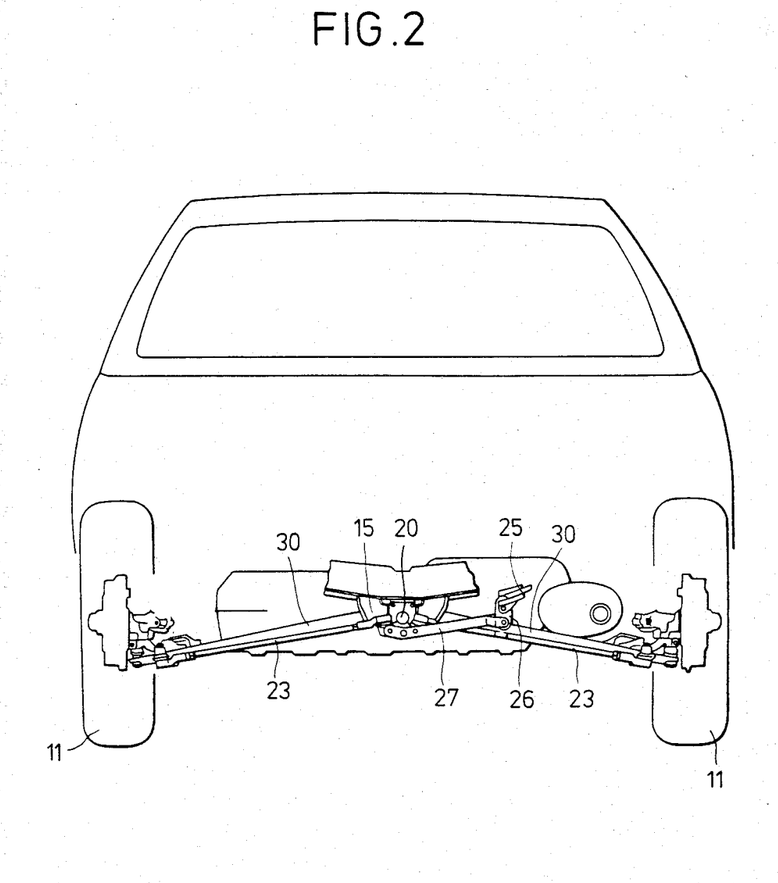
FIG. 2 is a rear view of the vehicle of FIG. 1.

Referring first to FIGS. 1 and 2, a steering motion of a steering wheel 1 is converted to a transverse motion of two tie rods 4 for steering two front wheels 3 through a rack and pinion type steering gear 2 which, for example, is provided internally with a power cylinder, and the front wheels 3 are steered by a pivotal movement of two knuckle arms 5 connected to the outer ends of the tie rods 4.

A linkage member 6 is connected to an approximately central part of the steering gear 2. More specifically, a linkage shaft 9 is connected through a universal joint 8 to a shaft 7 of a driven pinion so as to extend to the rear side of the vehicle body, the driven pinion being in mesh through an idle gear (not shown) with a rack (not shown) which constitutes the steering gear 2. Further, a shaft member 12 (FIG. 3) which constitutes an input portion of a steering mechanism for two rear wheels 11 is connected to the linkage shaft 9 through a universal joint 10.

The shaft member 12 is disposed on a center line with respect to the right and left of the vehicle body so that its rear portion is in a lowered state, and a crank portion 13 is provided at the rear end of the shaft member 12, with a crank pin 14 thereof projecting rearwardly. The shaft member 12 is inserted and supported in a sleeve 16 which is integrally fixed to a lower arm bracket 15 for the rear wheels, the bracket 15 being attached to a cross member of a vehicle body frame (not shown).

Figure 5:
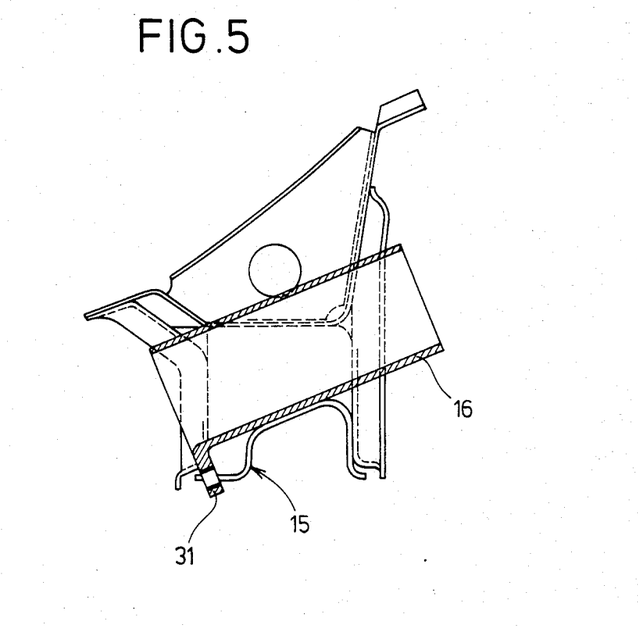
FIG. 5 is a longitudinal sectional side view of a sleeve portion fixed to a vehicle body.
Figure 6:
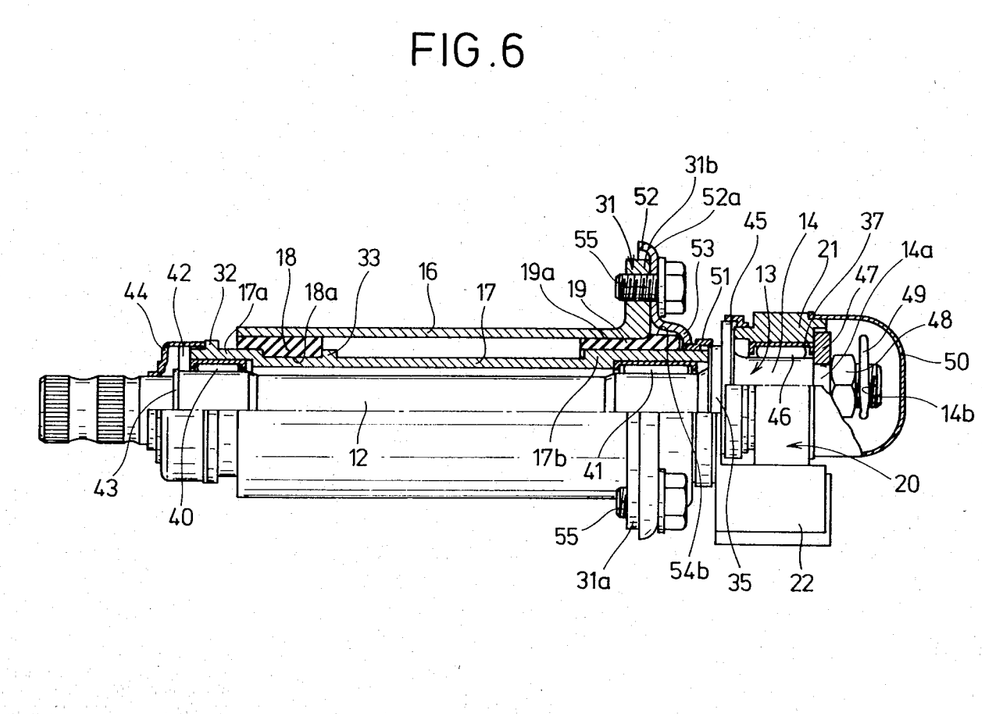
FIG. 6 is a partly broken-away side view of a shaft member mounting portion.

More specifically, as shown in FIG. 6, two front and rear rubber bushings 18 and 19 are interposed between the sleeve 16 fixed to the bracket 15 as shown in FIG. 5 and a shaft holder 17 for the shaft member 12 supported within the sleeve 16, the shaft holder 17 being press-fitted in the sleeve 16 through the rubber bushings 18 and 19. Thus, the shaft member 12 is rubber-mounted on the vehicle body and hence supported in a floating state.

FIGS. 5 and 6 are reverse to each other with respect to right and left in the direction showing the section of the sleeve 16.

Figure 3:
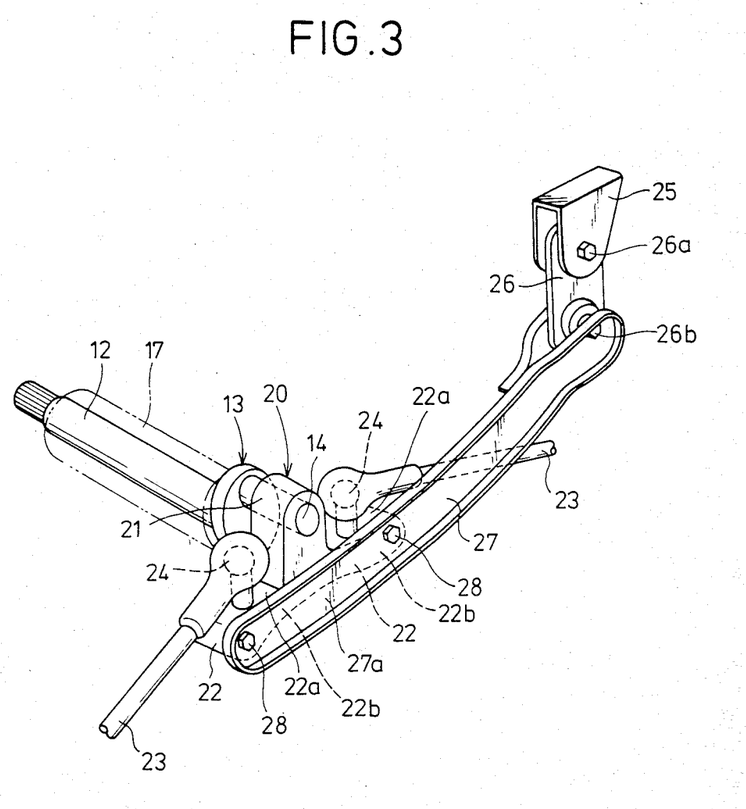
FIG. 3 is an enlarged perspective view showing a basic construction of a principal portion of an embodiment the invention.

As clearly shown in FIG. 3, a joint member 20, which is substantially inverted T-shaped in front view, is loosely mounted at its upper or center portion 21 on the crank pin 14 of the crank portion 13 attached to the shaft member 12. The joint member 20 has projecting portions 22 which constitute both right and left lower portions of the joint member, and rear wheel steering tie rods 23 are connected to and supported by upper surfaces 22a of the projecting portions 22 through ball joints 24.

Figure 4:
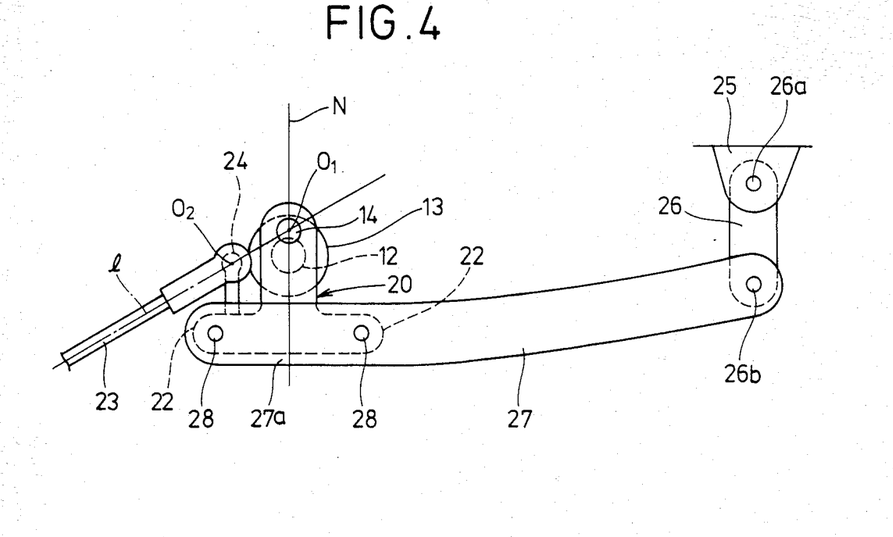
FIG. 4 is an enlarged diagrammatic rear view of the principal portion of FIG. 3 viewed from the back of the vehicle, with the right-hand rear wheel steering tie rod being omitted.

The tie rods 23, ball joints 24 and crank pin 14 are mounted so that the axis l of the tie rod 23, the center $O_2$ of the ball joint 24, and the core $O_1$ of the crank pin 14 which coincides with a center line N with respect to the right and left of the vehicle body in a neutral state of the rear wheels 11, are substantially aligned with one another in a straight line on each of the right and left sides, as shown in FIG. 4.

On the other hand, a link bracket 25 is fixedly suspended from one side of a vehicular floor panel (not shown) in a position rearward of the joint member 20, and a first link member 26 is pivotably suspended from the bracket 25 through a pin 26a. To the lower portion of the link member 26 is pivotably connected an arm member 27 through a pin 26b. The arm member 27, which functions as a second link member, is formed sufficiently long beyond the center line N with respect to the right and left of the vehicle body, and a fore portion 27a of the arm member 27 is integrally fixed to rear face portions 22b of the right and left projecting portions 22 of the joint member 20 by means of two right and left bolts 28, thereby allowing the joint member 20 to perform a composite pivotal motion consisting of vertical and transverse motions along with the cranking motion of the crank pin 14.

The numerals 29 and 30 in FIGS. 1 and 2 denote a knuckle arm connected to the outer end of the rear wheel steering tie rod 23 and a lower arm for the rear wheel, respectively.

Figure 7:
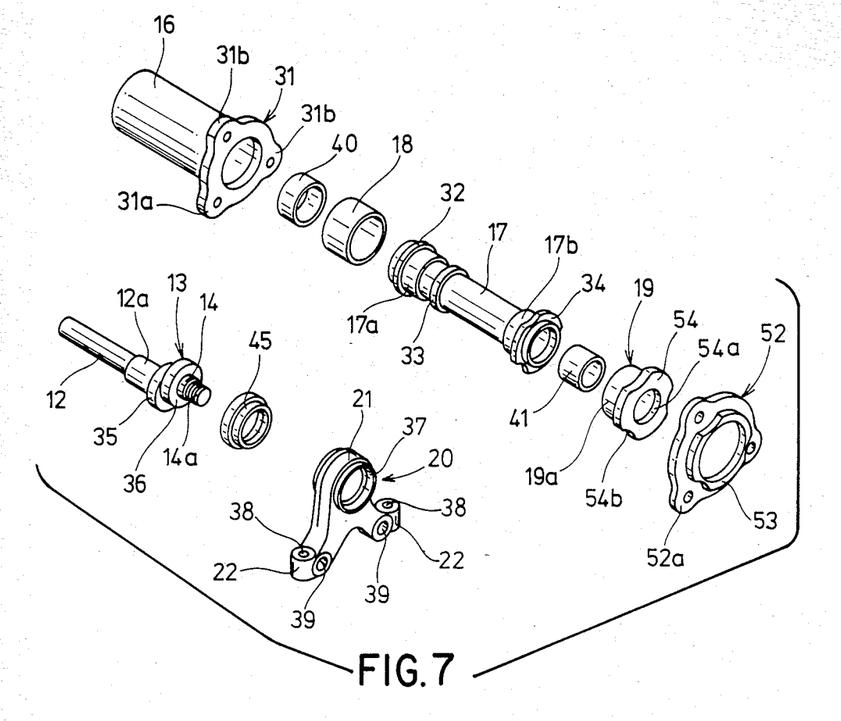
FIG. 7 is an exploded perspective view of a mounting member.

In this embodiment, the shaft member 12, joint member 20, etc. are mounted as a sub-assembly to the vehicle body, as will be described in detail below with reference to FIG. 7 which is an exploded perspective view, as well as FIGS. 5 and 6.

As previously noted, the sleeve 16 is fixed to the lower arm bracket 15 for the rear wheel which is attached to the cross member of the vehicle body frame, and is positioned on the center line with respect to the right and left of the vehicle body so that its rear portion is in a lowered state. On the outer periphery of the rear end of the sleeve 16 is formed a mounting seat portion 31 which comprises three radially outwardly extending pieces—one lower piece 31a and two upper right and left pieces 31b.

The cylindrical shaft holder 17 which is inserted in the sleeve 16 and which holds the shaft member 12 rotatably, has a fore enlarged-diameter portion 17a enlarged in both inside and outside diameters, and on the outer periphery of the fore enlarged-diameter portion 17a is formed a flange portion 32 in a position close to the fore end. Further, on the outer periphery behind the fore enlarged-diameter portion 17a is formed a flange portion 33 in a position somewhat spaced from the enlarged-diameter portion 17a, and the rear portion of the shaft holder 17 is also formed with an enlarged-diameter portion 17b similar to the fore portion. On the outer periphery of the rear enlarged-diameter portion 17b is formed a positioning member 34 in a position close to the rear end, the positioning member 34 consisting of three radially extending pieces.

On the other hand, the rear portion of the shaft member 12 is formed with an enlarged-diameter portion 12a, and a flange portion 35 is formed at the rear end of the rear enlarged-diameter portion 12a, with the crank portion 13 being formed on the rear face of the flange portion 35. The crank portion 13 comprises a flange 36 which is eccentric with respect to the shaft member 12, and the crank pin 14 projecting from the rear face of the flange 36. The rear end portion of the crank pin 14 is formed with an externally threaded portion 14a and also with a radially extending through hole 14b.

The joint member 20 mounted loosely on the crank pin 14 is generally inverted T-shaped in front view with its height being relatively small, and is provided in its upper portion 21 with a crank pin inserting through hole 37 of a large diameter formed in the longitudinal direction. Further, the projecting portions 22 which constitute right and left lower portions of the joint member 20 are each provided with a small-diameter pin hole 38 for the ball joint formed therethrough in the vertical direction and also provided is an arm member mounting hole 39 of a small diameter formed therethrough in the longitudinal direction in a position inwardly of the pin hole 38.

First, as shown in FIG. 6, bearings 40 and 41 are fitted in the fore and rear enlarged-diameter portions 17a and 17b, respectively, of the shaft holder 17, then the shaft member 12 is inserted into the holder 17, and a washer 42 is fitted on the outer periphery of the shaft member 12 projecting forwardly from the fore end of the holder 17. The thrust motion of the washer 42 is prevented by a circlip 43, allowing the washer to abut the fore end face of the holder 17, and in this state a seal cap 44 is fitted onto the holder 17 from the front up to the flange portion 32 formed near the fore end of the holder. At this time, the rear end flange portion 35 of the shaft member 12 is somewhat spaced from the rear end face of the holder 17.

A seal ring 45 is fitted onto the flange 36 of the crank portion 13 from behind the rear end flange portion 35 of the shaft member 12, while a bearing 46 is mounted on the crank pin 14, and the crank pin 14 is inserted into the insertion hole 37 formed in the upper portion 21 of the joint member 20. Further, a washer 47 is attached to the rear portion of the crank pin 14 projecting behind the joint member 20, and a nut 48 is brought into threaded engagement with the externally threaded portion 14a, allowing the washer 47 to abut the peripheral edge of the insertion hole 37 of the joint member 20. Then, a split pin 49 is inserted and retained within the hole 14b formed in the rear end portion of the crank pin 14, and a seal cap 50 is fitted onto the upper portion 21 of the joint member 20.

The thus pre-mounted sub-assembly consisting of shaft member 12, shaft holder 17 and joint member 20 is attached to the vehicle body in the following manner.

First, another seal ring 51 is fitted from the front over both the rear end flange portion 35 of the shaft member 12 and the rear end of the rear enlarged-diameter portion 17b of the shaft holder 17, and a mounting member 52 having three radially extending mounting pieces 52a is fitted over the outer periphery of the fore portion of the seal ring 51. The mounting member 52 has a rearwardly concave portion 53 centrally formed therein. The concave portion 53 receives therein the rubber bushing 19 and prevents its rotation.

Then, the two front and rear rubber bushings 18 and 19 are fitted on the outer periphery of the shaft holder 17.

The inner periphery of the fore end of the rear rubber bushing 19 is formed with a small-diameter portion 19a, while the rear half portion thereof constitutes a positioning large-diameter portion 54, which is formed sufficiently larger than the positioning member 34 of the shaft holder 17 and which has an engaging groove 54a formed in the inner periphery thereof. The positioning large-diameter portion 54 is provided in its periphery with three radially-formed notches 54b.

On the other hand, the front rubber bushing 18 is formed with a small-diameter portion 18a from the inner periphery of its fore portion up to the inner periphery of its rear end, the small-diameter portion 18a engaging between the fore enlarged-diameter portion 17a of the shaft holder 17 and the flange portion 33 spaced rearwardly therefrom.

Figure 8:
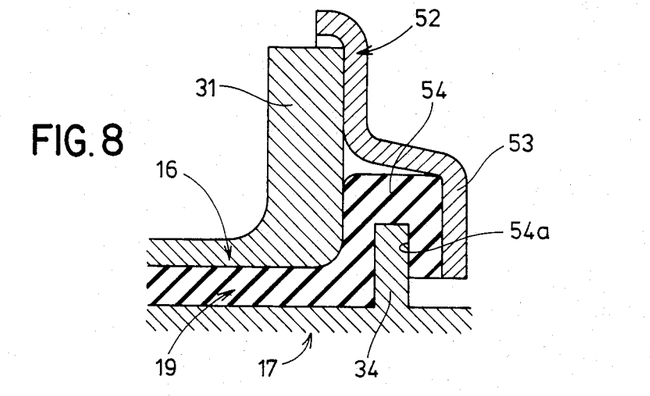
FIG. 8 is an enlarged longitudinal sectional view of a positioning structure.

The shaft holder 17 is inserted from behind into the sleeve 16 through the rubber bushings 18 and 19, and then the mounting pieces 52a of the mounting member 52 are brought into abutment with the mounting pieces 31a and 31b of the mounting seat portion 31 formed on the outer periphery of the rear end of the sleeve 16, and fixed thereto with bolts 55. In this case, as shown in FIG. 8, the positioning member 34 of the shaft holder 17 abuts the mounting seat portion 31 of the sleeve 16 through the positioning large-diameter portion 54 of the rear rubber bushing 19, whereby positioning is effected.

Thereafter, the right and left rear wheel steering tie rods 23 are connected to and supported by the joint member 20 through the ball joints 24, and the arm member 27 is fixed to the joint member 20 with bolts 28 (FIG. 3). The mounting of the components of the rear wheel steering mechanism is then complete.

Operation of the steering system constructed as described above will now be described. First, when the vehicle is travelling straight ahead, that is, when the steering wheel 1 is in the neutral position, the crank portion 13 is in a perpendicular state with its crank pin 14 located in an upper position, for example.

In this state, if the steering wheel 1 is turned, for example, to the left, the front wheels 3 are also steered to the left, and at the same time the shaft member 12 rotates clockwise when viewed from the back of the vehicle through the linkage member 6 consisting of the pinion shaft 7 leading out from the steering gear 2 through an idle gear (not shown) and the linkage shaft 9, so that the crank pin 14 of the crank portion 13 also cranks clockwise and the joint member 20 loosely fitted on the crank pin 14 pivots first to the right. Consequently, the rear wheel steering tie rods 23 connected to the right and left projecting portions 22 of the joint member 20 which is generally inverted T-shaped in front view, move to the right in response to the pivotal movement of the joint member 20, so that the knuckle arms 29 pivot counterclockwise in plan view, whereby the rear wheels 11 are steered to the left together with the front wheels 3.

The left-hand steering amount of the rear wheels 11 becomes maximum when the crank pin 14 assumes a horizontal state to the right, and thereafter until the crank pin 14 assumes a perpendicular state in its lower position, the left-hand steering amount of the rear wheels 11 is decreased gradually to zero by the left-hand pivotal motion of the joint member 20.

As the crank pin 14 further cranks clockwise, the joint member 20 further pivots to the left, and until the crank pin 14 assumes a horizontal state to the left, the rear wheels 11 are steered in a steering amount which gradually increases to the right opposite to the front wheels 3.

Then, until the crank pin 14 again assumes a perpendicular state in its upper position beyond the aforementioned maximum state of right-hand steering amount of the rear wheels 11, the right-hand steering amount of the rear wheels 11 is gradually decreased to zero by the right-hand pivotal motion of the joint member 20. Operation of the steering system of the invention when the steering wheel 1 is turned to the right is also performed in the same manner.

Thus, there is constituted a turning angle function generating mechanism whereby the rear wheels 11 can be steered in the same direction as the front wheels 11 at a small turning angle operation (up to 180° from the neutral position of the crank pin 14 which is assumed to be 0°) of the steering wheel 1 and in the reverse direction at a large turning angle operation (from 180° to 360°).

Further because the vehicular steering system of this embodiment is capable of generating such turning angle functions is constructed as follows, it has attendant advantages as will be described hereinafter. That is, the joint member 20 loosely mounted and supported on the crank pin 14 is constituted by a generally inverted T-shaped part in front view which is a small-sized part, and in its upper portion 21 it is loosely fitted and supported on the crank pin 14; the rear wheel steering tie rods 23 are connected and supported to the upper surfaces 22a of the projecting portions 22 which constitute right and left lower portions of the joint member 20; and the arm member 27 is integrally connected to the rear faces 22b of the projecting portions 22, and is pivotally connected to the link member 26 which is suspended in a position rearward of the joint member 20 on one side of the vehicular floor panel, to thereby constitute the rear wheel steering mechanism.

Consequently, it is possible to increase the length of the lower arm 30 as a constituent member of the rear wheel suspension mechanism according to suspension characteristics, hence dispose the bearings of the right and left lower arms 30 in positions near the center line with respect to the right and left of the vehicle body, and consequently dispose the rear wheel steering tie rods 23 compactly in opposed manner in the vicinity of such center line, whereby the reduction in size in the vertical direction which has been considered extremely desirable from the aspect of vehicle body structure can be attained.

In the present invention, moreover, because the core $O_1$ of the crank pin 14, the center $O_2$ of the ball joint 24 and the axis l of the rear wheel steering tie rod 23 are substantially aligned with one another on each of right and left sides, as shown in FIG. 4, an external force from the tie rod 23 will never be exerted as a moment about the crank pin 14 upon the joint member 20 which pivots about the crank pin 14.

Therefore, little external force is exerted upon the arm member 27 which constitutes the link member and which restrains the transverse pivoting of the joint member 20, so that the load acting on the arm member 27 can be limited to the pivoting load of the joint member 20, that is, it can be minimized, thereby permitting reduction in both wall thickness and weight of the arm member 27.

Moreover, the arm member 27 is pivoted to the link member 26, which in turn is suspended from the vehicle body on one side and in a position rearward of the joint member 20, so that, although the arm member 27 can be thin-walled despite its relatively large size because a large load does not act thereon, the present invention permits realization of a further reduction of its wall thickness. Also, coupled with the reduction in size attained by the adoption of a generally inverted T form of the joint member 20 which requires a large strength, a further reduction in weight of the entire system can be attained.

Furthermore, in the foregoing embodiment, the shaft member 12, shaft holder 17 and joint member 20 are assembled in advance as a sub-assembly, which is then inserted and mounted into the sleeve 16 fixed to the vehicle body. Therefore, the mounting operation is facilitated and a great advantage is attained with respect to working efficiency in the mounting operation. Further, because the constituent members are not each individually mounted to the vehicle body, it is no longer necessary for the vehicle body side to undergo a machining which requires a special accuracy, and this is also very convenient with respect to machinability.

Although not shown in the drawings, the link member 26 as a constituent member of the link mechanism is pivoted to the bracket 25 and to the arm member 27 respectively through rubber bushings, which, in cooperation with the rubber mounting of the shaft member 12, affords a superior anti-vibration effect.

According to the present invention, as will be apparent from the above description, the constituent members of the rear wheel steering mechanism can be disposed compactly in a minimized vertical space, and the load acting on the arm member which restrains the pivoting motion of the joint member can be rendered as small as possible, thereby permitting attainment of reduction in both size and weight of the rear wheel steering mechanism.

What is claimed is:

1. A steering system in a vehicle having front and rear wheels capable of being steered, comprising a rear wheel steering mechanism comprising:
    a shaft member adapted to rotate in interlocking cooperation with a steering wheel, said shaft member being inserted and supported rotatably through a cylindrical holder in a sleeve fixed to a vehicle body;
    a crank pin attached to said shaft member;
    a joint member having a center portion thereof loosely mounted and supported on said crank pin;
    a link mechanism pivoted at one end thereof to the vehicle body and integrally connected at the other end thereof to said joint member; and
    right and left rear wheel steering tie rods connected and supported respectively through ball joints to portions of said joint member disposed respectively on the right and left of said center portion thereof, the axis of each said rear wheel steering tie rod, the center of each said ball joint and the core of said crank pin being substantially aligned with one another in a straight line on each of right and left sides.

2. A steering system in a vehicle according to claim 1, wherein said shaft member is inserted into said holder and said joint member is substantially loosely fitted on said crank pin attached to said shaft member, thereby constituting a mounting assembly, said mounting assembly being mounted to the vehicle body by inserting said holder into said sleeve.

* * * * *